March 28, 1950

V. J. KLEJNA 2,502,157

FOOD CUTTER

Filed June 18, 1946

Inventor
Vincent J. Klejna

By Clarence A. O'Brien
and Harvey B. Jacobson
Attorneys

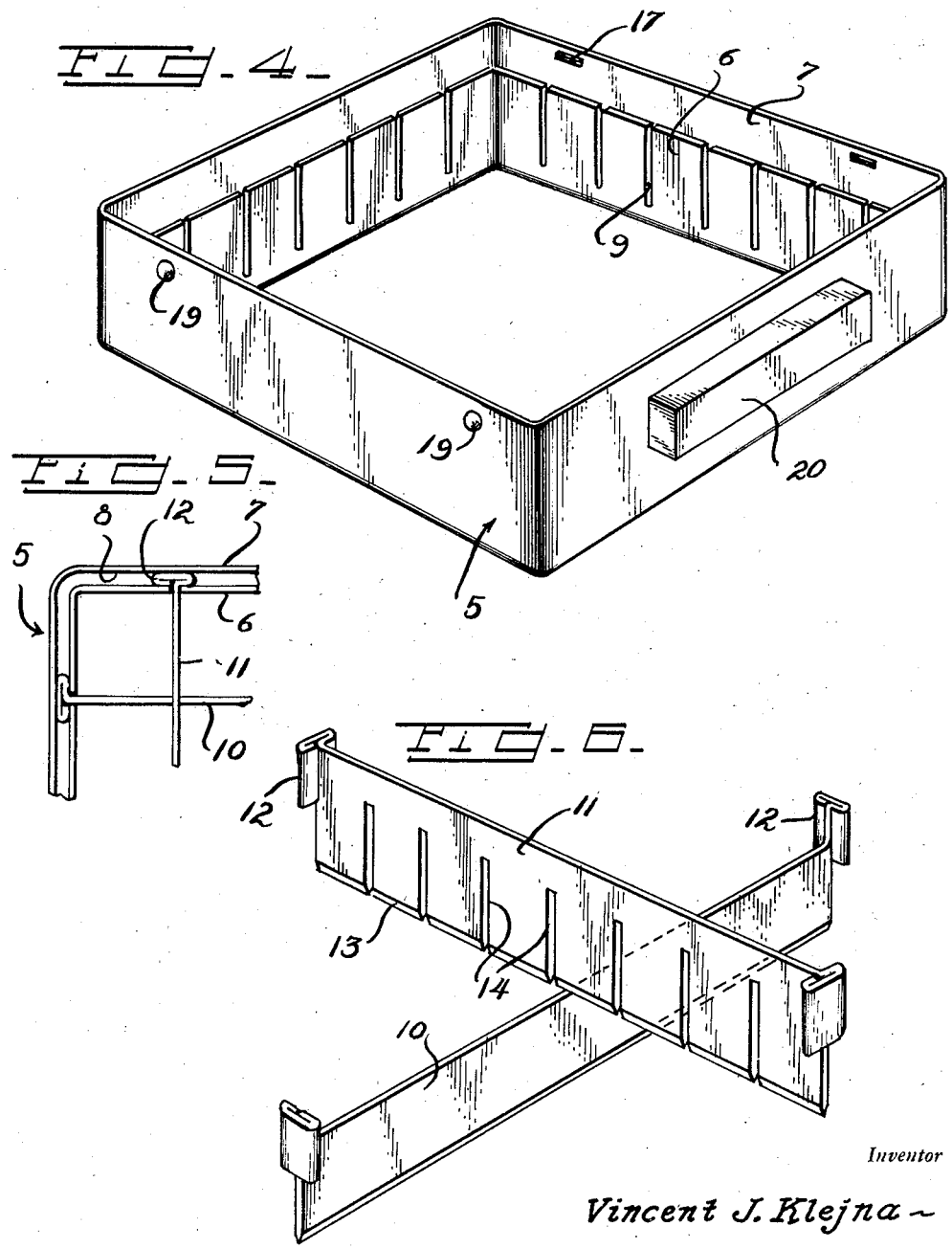

Patented Mar. 28, 1950

2,502,157

UNITED STATES PATENT OFFICE 2,502,157

FOOD CUTTER

Vincent J. Klejna, Blanchester, Ohio

Application June 18, 1946, Serial No. 677,495

3 Claims. (Cl. 30—303)

The present invention relates to new and useful improvements in cutters for vegetables, butter, cheese, meat and other food products and more particularly to a device of this character for dicing or cutting the food into strips of a desired width.

An important object of the present invention is to provide a cutter of this character embodying a square shaped frame in which blades may be mounted and retained in either a crossed or parallel relation.

A further object of the invention is to provide a locking frame for removably securing the blades in position in the supporting frame.

A still further object of the invention is to provide a device of this character, of simple and practical construction, which is strong and durable, efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 4 is a perspective view of the blade supporting frame.

Figure 5 is a fragmentary top plan view of one corner of the cutter with the lock frame removed, and Figure 6 is a perspective view of a pair of the crossed cutters.

Figure 1:
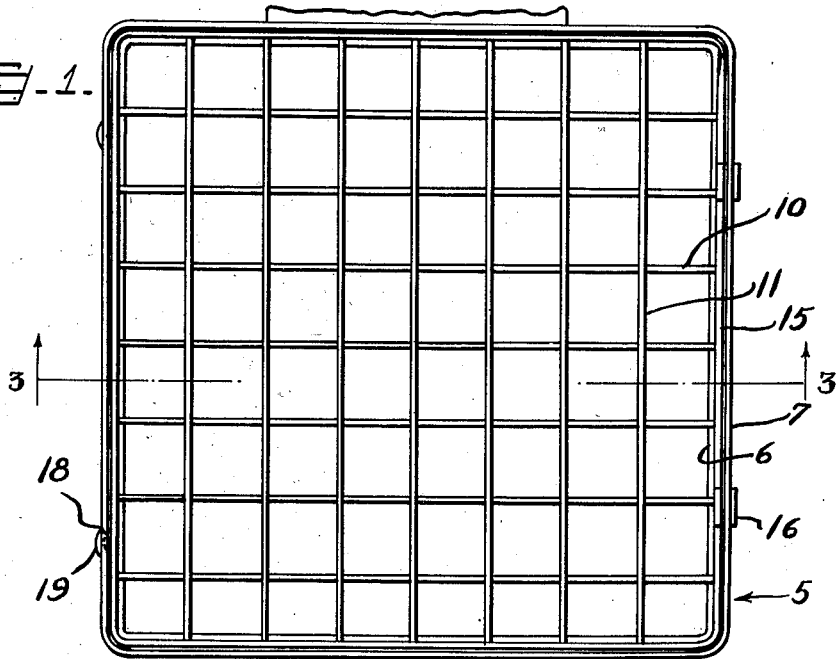
Figure 1 is a top plan view.
Figure 2:
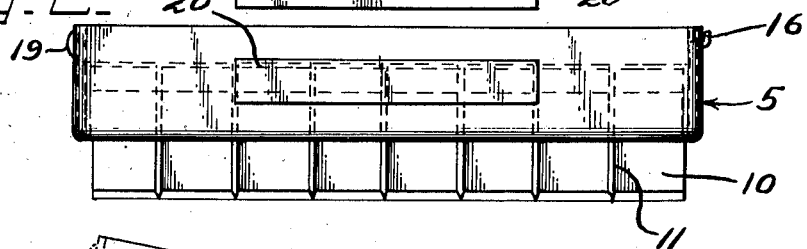
Figure 2 is a side elevational view.
Figure 3:
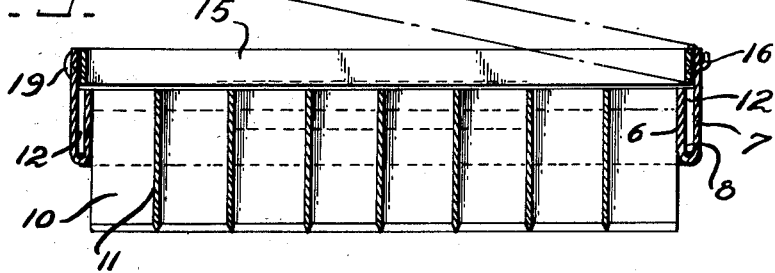
Figure 3 is a transverse sectional view taken on a line 3—3 of Figure 1.

Referring now to the drawings in detail, wherein for the purpose of illustration I have disclosed a preferred embodiment of the invention the numeral 5 designates the blade supporting frame which is preferably of square shaped construction and of lightweight metal and with the lower edge of the frame bent inwardly to form inner and outer spaced apart walls 6 and 7 providing a channel 8 therebetween. The upper edge of the inner wall 6 terminates below the upper edge of the outer wall 7 and the inner wall, at each of the four sides of the frame is formed with spaced parallel vertical slots 9 extending through the upper edge of the inner wall 6.

A plurality of knife blades 10 and 11 are formed at the upper portion of each end thereof with lateral flanges 12 projecting outwardly at opposite sides of the blade. The flanges 12 are preferably formed by bending a portion of the material at the upper or back edge of the blade upon itself at right angles to the blades in a manner as will be apparent from an inspection of Figure 6 of the drawings.

The flanges 12 are adapted to enter the channels 8 between the inner and outer walls of the frame 5 with the lower or cutting edges 13 of the blade projecting downwardly below the frame.

The blades 10 are arranged in spaced parallel relation to each other in the frame with their ends received in the slots 9 of a pair of the opposed inner walls 6 and the blades 11 are likewise arranged in spaced apart parallel relation with respect to each other in crossed relation with respect to the blades 10 and with the ends of the blades 11 likewise received in the slots 9 of the remaining pair of opposed inner walls 6. The lower portions of the blades 11 are formed with spaced apart vertical slots 14 to receive the upper edges of the blades 10 so that the lower cutting edges of the blades 10 and 11 are arranged in a horizontal plane. For this purpose the flanges 12 of the blades 10 project upwardly above the blades so that the upper edges of the flanges of both the blades 10 and 11 will be positioned in the channels 8 flush with the upper edge of the inner walls 6 of the frame.

A locking frame 15 is adapted to rest on the upper edges of the flanges 12 of all of the blades, one side of the frame 15 being formed with a pair of upwardly curved tongues 16 constituting hooks for engagement in slots 17 formed in the upper portion of the outer walls 7 while the opposite side of the frame 15 is formed with one or more outwardly pressed knobs or detents 18 adapted for snapping into recesses 19 formed in the adjacent outer wall 7 of the frame 5 whereby to releasably lock the frame 15 in position at the inside of the outer wall 7 of the frame 5 for securing the flanges 12 of the blades 10 and 11 in position in the channels 8 and against upward movement in the frame 5 when pressure is exerted on the frame 5 to force the blades into the food to be cut.

Handle 20 may be welded or otherwise suitably secured to the outer surface of the frame 5.

It will be apparent that any desired number of the blades 10 and 11 may be mounted in the frame 5 to regulate the size of the food produced by the cutter and the blades 11 may be used together with the blades 10 to dice the food or the blades 11 may be removed and the blades 10 used for cutting the food in strips or slices.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having thus described the invention, what is claimed as new is:

1. In a cutter of the class described, a frame having inner and outer walls with a space therebetween, the inner walls having spaced, parallel, vertical slots therein extending through the upper edges of said inner walls and opening into said space, cutter blades having ends fitting in said slots and removable out of the open upper ends of said slots, said ends of the blades having cross flanges thereon wider than said slots and fitting in the space between said inner and outer walls, and a single locking device in said frame for engaging all of said flanges to prevent removal of said ends of the blades.

2. In a cutter of the class described, a frame having inner and outer walls with a space therebetween, the inner walls having spaced, parallel, vertical slots therein extending through the upper edges of said inner walls and opening into said space, cutter blades having ends fitting in said slots and removable out of the open upper ends of said slots, said ends of the blades having cross flanges thereon wider than said slots and fitting in the space between said inner and outer walls, and a single locking device in said frame for engaging all of said flanges to prevent removal of said ends of the blades, comprising a second frame fitting in the frame first named and resting on said cross flanges.

3. In a cutter of the class described, a frame having inner and outer walls with a space therebetween, the inner walls having spaced, parallel, vertical slots therein extending through the upper edges of said inner walls and opening into said space, cutter blades having ends fitting in said slots and removable out of the open upper ends of said slots, said ends of the blades having cross flanges thereon wider than said slots and fitting in the space between said inner and outer walls, and a single locking device in said frame for engaging all of said flanges to prevent removal of said ends of the blades, comprising a second frame fitting in the frame first named and resting on said cross flanges, said second frame being detachably hinged to the first frame to be swung out of the same and then detached therefrom.

VINCENT J. KLEJNA.

REFERENCES CITED

The following references are of record in the file of this patent:

UNITED STATES PATENTS

| Number | Name | Date |
|---|---|---|
| 123,540 | Williams | Feb. 6, 1872 |
| 1,445,787 | Meyers | Feb. 20, 1923 |
| 1,595,574 | Quevli | Aug. 10, 1926 |
| 1,867,657 | Dellinger | July 19, 1932 |

FOREIGN PATENTS

| Number | Country | Date |
|---|---|---|
| 779,242 | France | Jan. 10, 1935 |